(12) United States Patent
Higuchi et al.

(10) Patent No.: US 6,460,449 B2
(45) Date of Patent: Oct. 8, 2002

(54) AUTOMOTIVE ACTUATOR RETAINING CONSTRUCTION

(75) Inventors: Norihisa Higuchi; Toshiyuki Yamada, both of Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 09/761,587

(22) Filed: Jan. 18, 2001

(65) Prior Publication Data

US 2001/0010188 A1 Aug. 2, 2001

(30) Foreign Application Priority Data

Jan. 31, 2000 (JP) .......................... 2000-022145
Jul. 12, 2000 (JP) .......................... 2000-211111

(51) Int. Cl.$^7$ ............................................. F15B 15/26
(52) U.S. Cl. ................................. 92/23; 60/570
(58) Field of Search .................... 92/23, 128; 60/570

(56) References Cited

U.S. PATENT DOCUMENTS 4,766,804 A * 8/1988 Barker .......................... 92/23
4,995,492 A 2/1991 Babcock et al. ............... 92/23

FOREIGN PATENT DOCUMENTS

| EP | 0 086 060 A1 | 8/1983 |
| GB | 2 172 075 A | 9/1986 |
| JP | 4-8644 | 2/1992 |
| JP | 9-32805 | 2/1997 |

* cited by examiner

Primary Examiner—Edward K. Look
Assistant Examiner—Thomas E. Lazo
(74) Attorney, Agent, or Firm—McGuireWoods LLP

(57) ABSTRACT

A retaining unit 8 is constituted by a first retainer 25 and a second retainer 26. The first retainer 25 and the second retainer 26 are mounted, respectively, on a bleeder screw 7 of a cylinder body 11 and a projecting portion of a piston rod 19. While the piston rod 19 is being forced in a cylinder bore 13, first and second engagement portions 25d, 26e are brought into engagement with each other, and the piston rod 19 is retained in a retracted state. The engaged state of the first and second engagement portions 25d, 26e is released by removing the first retainer 25 from the bleeder screw 7, whereby the piston rod 19 is allowed to extend.

22 Claims, 7 Drawing Sheets

AUTOMOTIVE ACTUATOR RETAINING CONSTRUCTION

BACKGROUND OF THE INVENTION

1. Field of the Invention

The present invention relates to an automotive actuator retaining construction for retaining an actuator such a slave cylinder or servo which is used in operating brakes and a transmission clutch of an automotive vehicle in a retracted state and releasing the retracted state.

2. Description of the Related Art

Conventionally, for example, a clutch master cylinder and a slave cylinder or servo which are used as actuators for operating a transmission clutch of an automotive vehicle are connected to each other using pipings as a clutch piping system in a layout substantially equal to that resulting when they are actually installed on an automotive vehicle and then hydraulic operating fluid is filled in the system before they are shipped from a manufacturer, and thus clutch piping systems are shipped to an assembling plant of a car manufacturer in a so-called pre-fluid-filled state.

Of the two cylinders, the slave cylinder or servo is constructed such that a piston rod thereof extends into or retracts from a housing by virtue of movement of pressurized fluid from the clutch master cylinder which is a source for generating a hydraulic pressure. In the aforesaid pre-fluid-filled state, in order to prevent the piston rod from rattling, a retaining construction is used to retain the piston rod in a retracted state. Retaining constructions like this are disclosed, for example, in JP-B-4-8644 and JP-A-9-32805.

In the former retaining construction, a retaining belt-like string is extended between the housing of a slave cylinder and a projecting end of a piston rod so that the piston rod is retained in a state in which the piston rod is retracted in a direction toward the housing, and the retaining belt-like string is constructed to be cut at a lowered-strength portion provided therein when an actuator is first operated after the clutch piping system is installed on an automotive vehicle.

Alternatively, in the latter retaining construction, a plurality of legs are provided on a protection boot for covering between the housing of a slave cylinder and a projecting end of a piston rod, for retaining a bellows portion in a retracted state. Further, in the legs, there are provided lowered-strength portions which are constructed to be broken by virtue of a projecting force of the piston rod.

In these retaining constructions, however, since the load required for operating the clutch pedal so as to tear the retaining belt-like string and the legs of the protection boot also acts on seals of the actuator and the protection boot to thereby impose an unnecessary load thereon, the construction is not desirable. In addition, burrs and broken particles are generated on cut surfaces of the retaining belt-like string and the legs, and these cause problems in servicing the actuator for maintenance thereof. Moreover, the retaining belt-like string and the legs which are cut or broken continue to suspend and this deteriorates the external appearance of the relevant portion of the automotive vehicle.

SUMMARY OF THE INVENTION

The invention was made to cope with these problems and an object thereof is to provide an automotive actuator retaining construction for retaining a piston rod of an actuator for use in a braking system or a transmission clutch in a retracted state from filling a clutch piping system with a hydraulic fluid at the time of manufacture until installing the clutch piping system on an automotive vehicle, while securely avoiding suffering from the aforesaid problems.

With a view to attaining the aforesaid object, according to a first aspect of the invention, there is provided an automotive actuator retaining construction adapted to retain a piston rod accommodated in a housing of an actuator in an extensible or retractable fashion in a state in which the piston rod is retracted in a direction toward the housing and to release the piston rod from the retracted state so as to permit the extension and/or retraction of the piston rod when the actuator is put in operation, the automotive actuator retaining construction comprising a first retainer adapted to be mounted on one of the housing and the piston rod and a second retainer adapted to be mounted on the other, wherein at least the first retainer is adapted to be removed from the one of the housing and the piston rod, and wherein the first and second retainers are connected to each other in such a manner as to be disengaged from each other, whereby in a state in which the first and second retainers are in engagement with each other, the retracted state of the piston rod is maintained, whereas the engagement between the first and second retainers is released by removing the first retainer from the one of the housing and the piston rod, the piston rod being thereby permitted to extend and/or retract.

According to the construction, the retracted state of the piston rod is retained by virtue of the connection of the first and second retainers, and the engagement state of the first and second retainers is released by removing the first retainer from one of the housing and the piston rod, whereby the piston rod extends from the housing, the piston rod being thereby permitted to extend and/or retract.

In addition, at least the first retainer is assembled in such a manner as to be removed from the one of the housing and the piston rod, but the invention may not prevent the second retainer from falling from the other of the housing and the piston rod as a result of the disengagement of the second retainer from the first retainer.

According to a second aspect of the invention, there is provided an automotive actuator retaining construction as set forth in the first aspect of the invention, wherein the first retainer comprises an assembling unit adapted to be mounted on one of the housing and the piston rod in such a manner as to be disengaged therefrom, a plurality of connecting legs disposed so as to extend along the one of the housing and the piston rod and first engagement portions formed at distal ends of the respective connecting legs, and wherein the second retainer comprises second engagement portions adapted to engage with and disengage from the first engagement portions.

According to a third aspect of the invention, there is provided an automotive actuator retaining construction as set forth in the second aspect of the invention, wherein the assembling unit of the first retainer surrounds one of the housing or the piston rod and is formed into a C shape having a slit for removal of the first retainer in a certain part thereof. According to a fourth aspect of the invention, there is provided an automotive actuator retaining construction as set forth in the second or third aspect of the invention, wherein the plurality of connecting legs are connected to each other by a lateral belt holding one of the housing and the piston rod in a circumferential direction. According to a fifth aspect of the invention, there is provided an automotive actuator retaining construction as set forth in the fourth aspect of the invention, wherein a breakable portion is provided on the lateral belt which is designed to break when the first retainer is removed.

According to a sixth aspect of the invention, there is provided an automotive actuator retaining construction as set forth in any of the aspects 2 to 5, wherein the engagement of the first and second retaining portions regulates an axial movement of the piston rod.

DETAILED DESCRIPTION OF THE PREFERRED EMBODIMENTS

Embodiments in which the invention is applied to a slave cylinder or servo of an automotive clutch will be described below with reference to the accompanying drawings.

Figure 1:
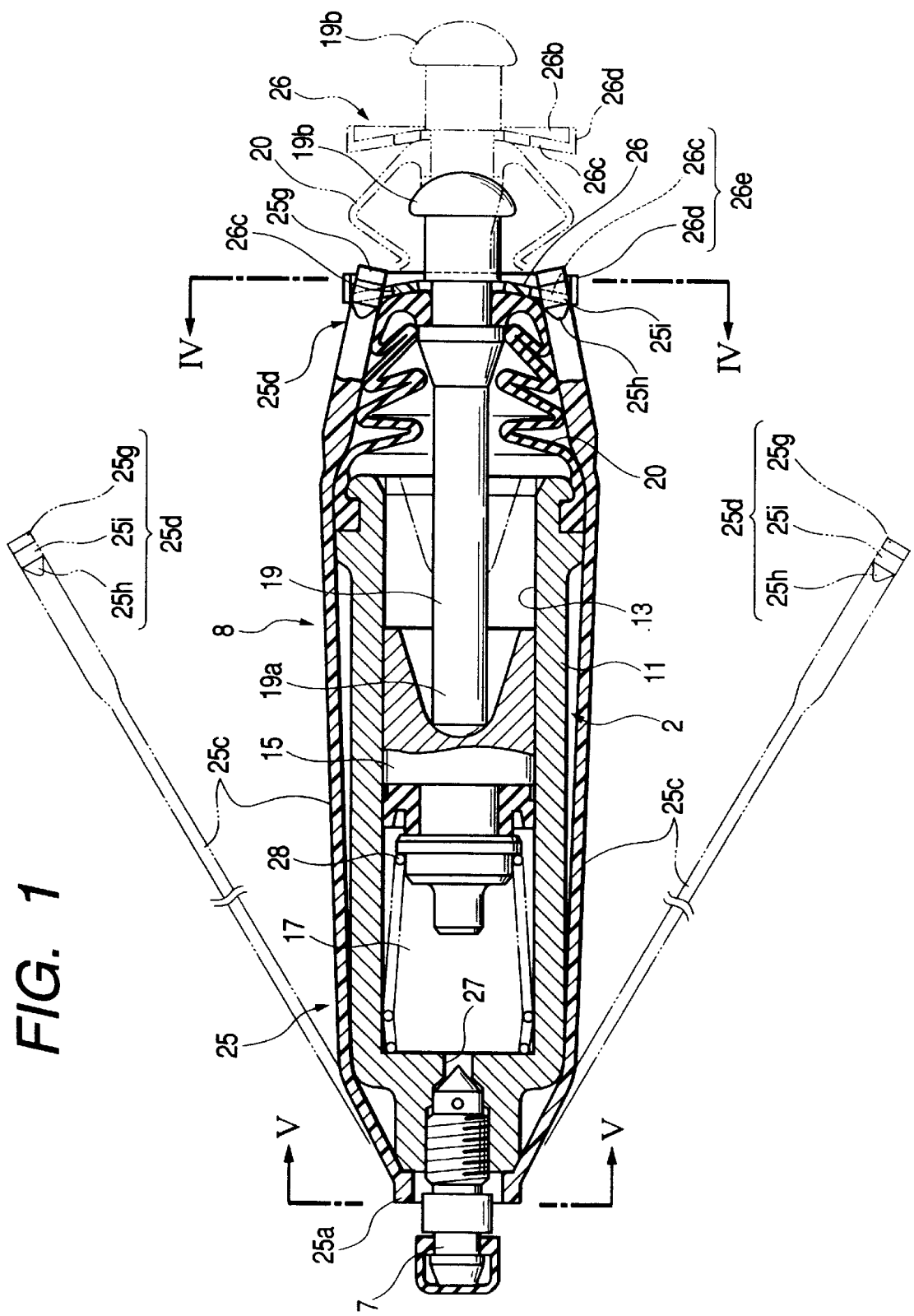
FIG. 1 is a front sectional view of a slave cylinder according to a first embodiment of the invention in which a piston rod is kept retained in a retracted state by a retaining unit.
Figure 2:
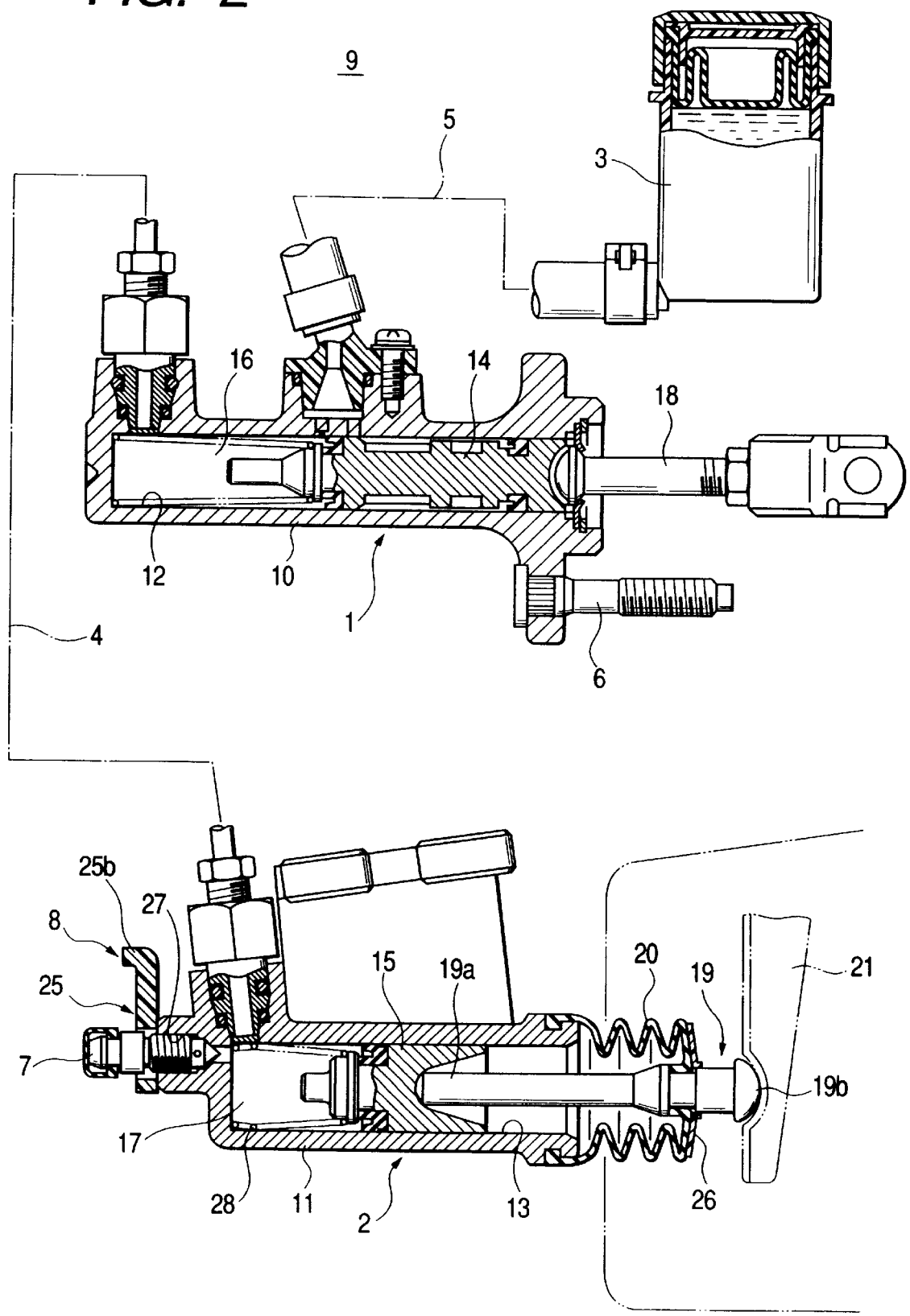
FIG. 2 is a schematic view of a clutch piping system according to the first embodiment of the invention.
Figure 3:
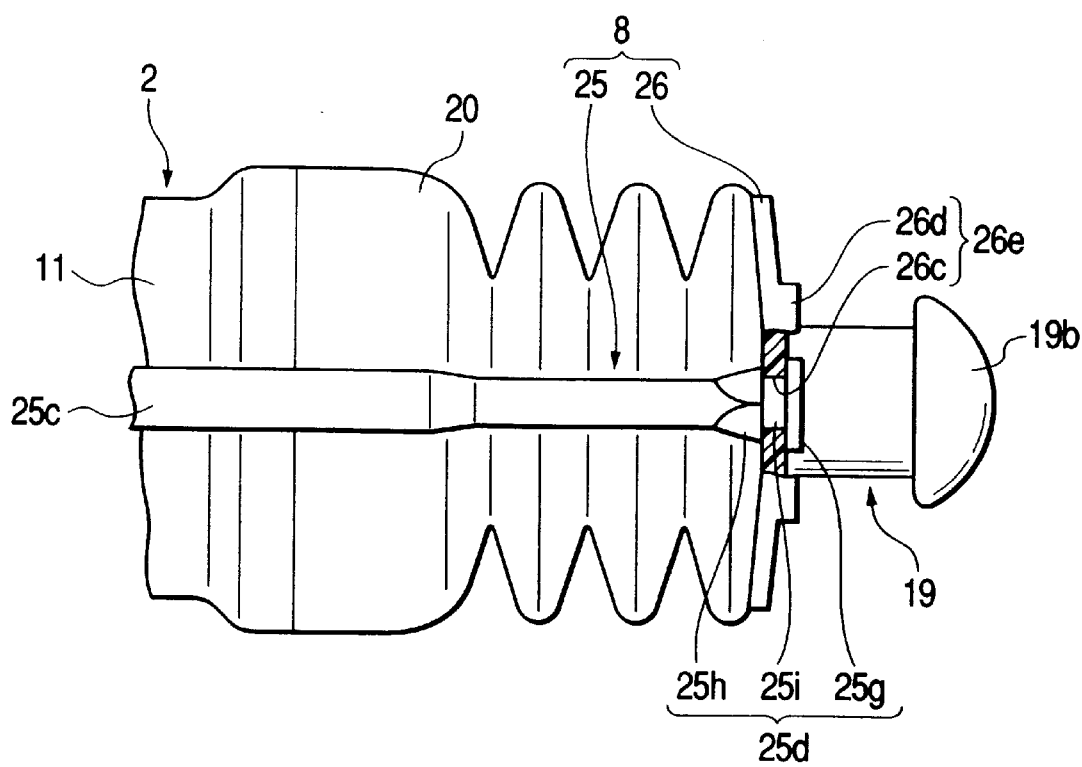
FIG. 3 is a sectional view taken along the line III—III in FIG. 4, showing the first embodiment of the invention.
Figure 4:
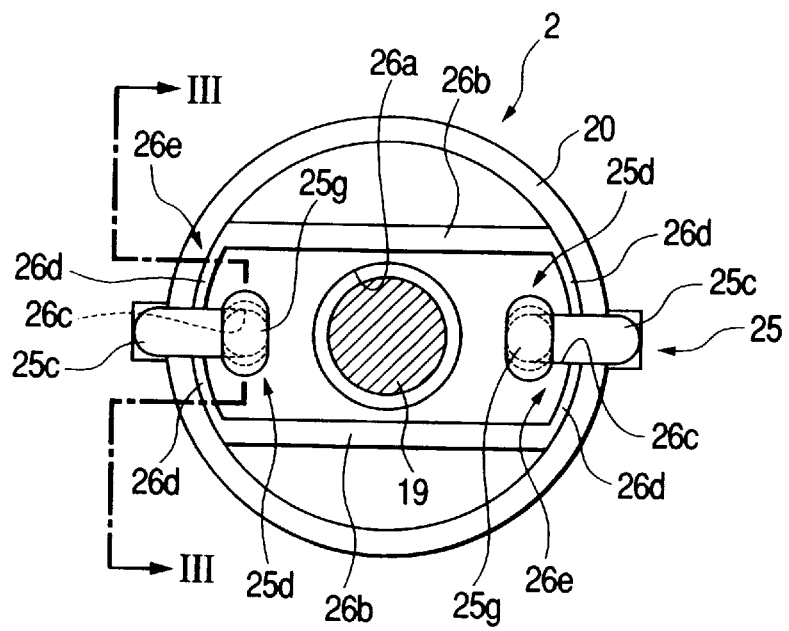
FIG. 4 is a sectional view taken along the line IV—IV in FIG. 1, showing the first embodiment of the invention.
Figure 5:
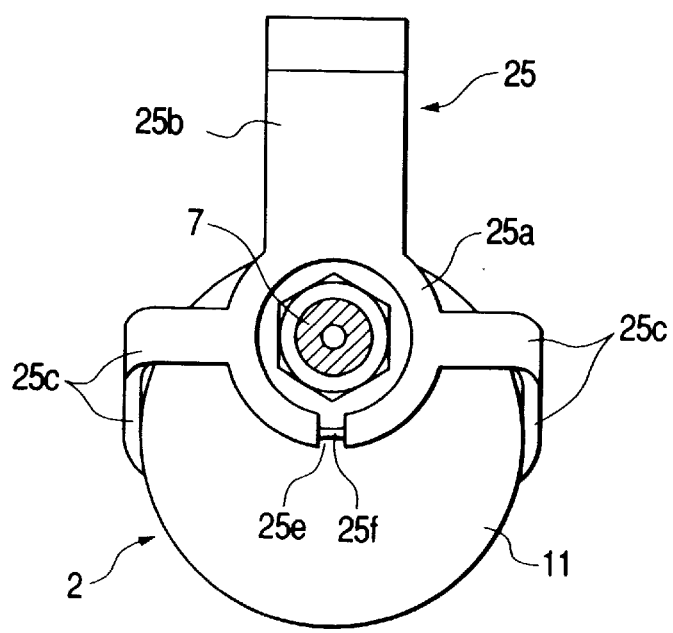
FIG. 5 is a sectional view taken along the line V—V in FIG. 1, showing the first embodiment of the invention.
Figure 6:
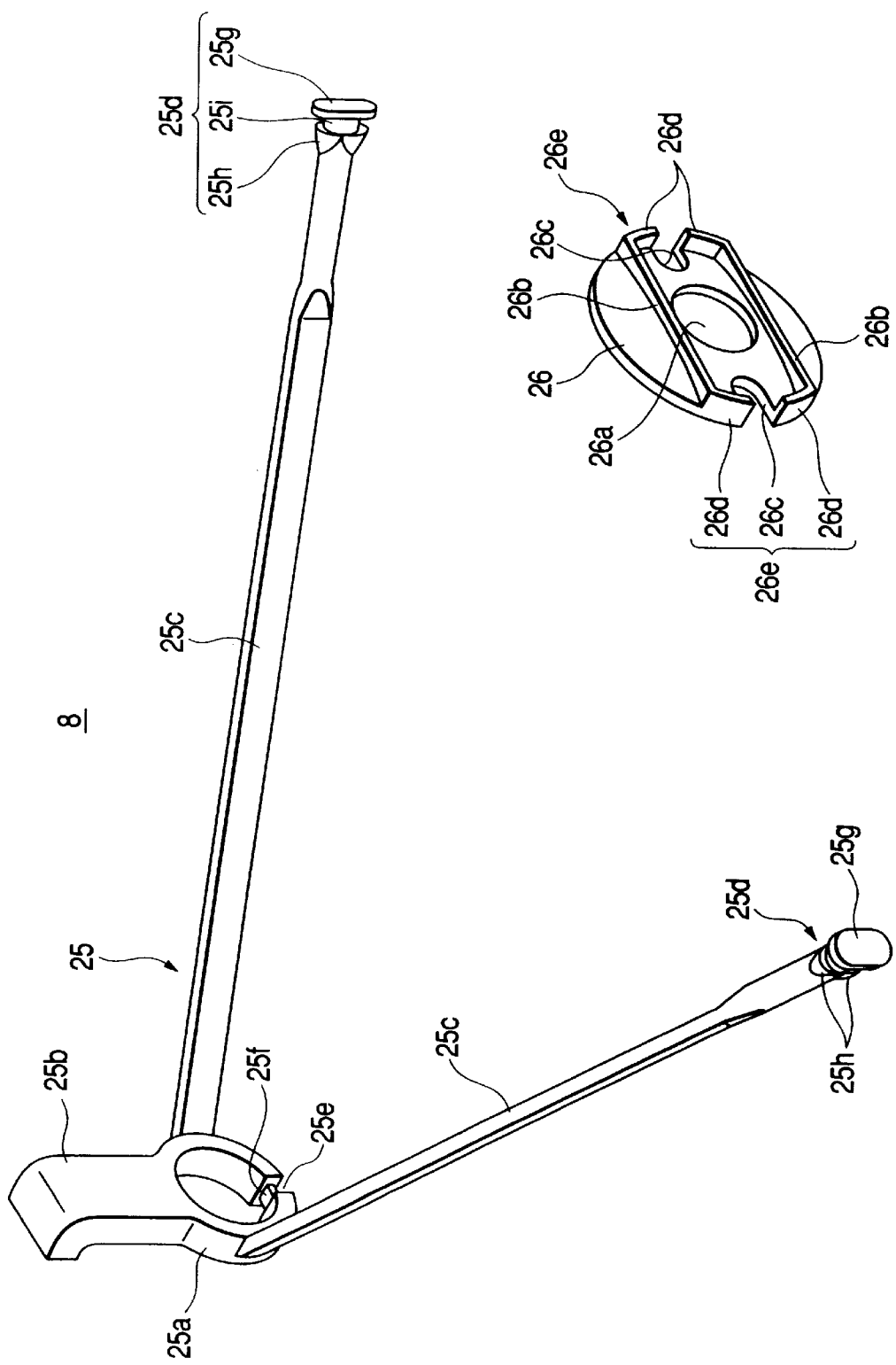
FIG. 6 is an exploded perspective view of a retaining unit according to the first embodiment.

In the first embodiment shown in FIGS. 1 to 6, a clutch master cylinder 1 and a slave cylinder 2 which are used as an actuator for an automotive clutch and a reservoir 3 for the clutch master cylinder are connected together in advance by an actuator manufacturer using pipings 4, 5, and furthermore a vehicle body mounting bolt 6, a bleeder screw 7 and a retaining unit 8 which will be described later are assembled to the master cylinder and the slave cylinder so connected, whereby a clutch piping system 9 as indicated by solid lines in FIG. 2 is built, the layout of which is substantially equal to that resulting when the system is actually installed on an automotive vehicle. Thus, the clutch piping system 9 is shipped to an assembly plant of a car manufacturer in a pre-filled state in which a clutch fluid is filled in the system from the reservoir 3 to the slave cylinder 2.

In the clutch master cylinder 1 and the slave cylinder 2, bottomed cylinder bores 12, 13 are drilled, respectively, in cylinder bodies 10, 11 which form housings, and pistons 14, 15 are fluid tightly and movably inserted, respectively, in the bottomed cylinder bores 12, 13, the inserted cylinders 14, 15 then forming fluid pressure chambers 16, 17, respectively, between bottom portions of the cylinder bores 12, 13 and themselves. The fluid pressure chambers 16, 17 of the master cylinder 1 and the slave cylinder 2 are connected to the aforesaid piping 4, and a piston rod 18 is inserted in an opening side of the cylinder bore 12 of the clutch master cylinder 1 in an extensible and retractable fashion, whereas a piston rod 19 is inserted in an opening side of the cylinder bore 13 of the slave cylinder 2 also in the extensible and retractable fashion.

The piston rod 19 of the slave cylinder 2 is disposed such that almost a half of the piston rod 19 is accommodated in the cylinder bore 13 with an inner end 19a thereof abutting against a piston 15, and a protection boot 20 is mounted over the piston rod between a cylinder bore opening side of the cylinder body 11 and a projecting portion of the piston rod 19. In addition, after the assembly of the clutch master cylinder, the slave cylinder and the reservoir is installed on the automotive vehicle, a clutch release fork 21 is disposed such that the fork 21 is brought into abutment with an outer end 19b of the piston rod 19. Furthermore, as described above, the retaining unit 8 is mounted on the pre-filled slave cylinder 2, and the piston rod 19 in the slave cylinder 2 is retained in a retracted state in a direction toward the housing by the retaining unit 8.

The retaining unit 8 includes a combination of a first retainer 25 made of a synthetic resin which is mounted on the cylinder body 11 in such a manner as to be disengaged therefrom and a second retainer 26 also made of a synthetic resin which is mounted on the projecting portion of the piston rod 19.

In the first retainer 25, an L-shaped lug 25b is provided on one side of an assembling unit 25a in such a manner as to erect therefrom, and legs 25c, 25c are provided at two diametrically facing positions on the assembling unit 25a which are perpendicular to a portion of the assembling unit 25a where the lug 25b is mounted in such a manner as to extend therefrom. First engagement portions 25d, 25d are provided at distal ends of the legs 25c, 15c.

The assembling unit 25a includes a C-shaped ring which is formed based on a short cylindrical unit having an inside diameter substantially identical to the diameter of a shank portion of the bleeder screw 7, by cutting away the short cylindrical unit by forming a slit 25e in a side thereof opposite to the lug 25b provided thereon, and the slit 25e is bridged by a fine anti-dislocation piece 25f. In addition, an assembling unit side of the leg 25c is formed into a belt-like shape, whereas a distal or first engagement portion side thereof is formed into a circular shape.

In the first engagement portion 25d, a flat oval plate-like first stopper 25g is provided at the distal end of the leg 25c in parallel with a direction in which the lug 25b projects, and a second stopper 25h is caused to expand from the leg 25c at a position spaced away from the first stopper 25g at an interval of slightly wider than the thickness of the second retainer 26, whereby the interval sandwiched by the two stoppers 25g, 25h is made to function as an engagement shaft 25i.

Note that the anti-dislocation piece 25f may be omitted from the first retainer 25 provided that the assembling unit 25a can be kept mounted on the bleeder screw 7 with the slit 25e being kept open.

According to this embodiment, while holding substantially the lower half of the outer circumference of the cylinder body, 11 the lateral belt 31g connects together the legs 31c, 31c of the first retainer 31 on the first engagement portion side thereof at the interval which is substantially equal to the diameter of the cylinder body 11. Thus, when the piston rod 19, which is in the retracted state, tries to rattle or incline radically, since the lateral 31g regulates the movement of the legs 31c, 31c minimally, unnecessary movements of the piston rod 19 are suppressed to thereby effectively prevent the rattle and inclination of the piston rod 19. As a result, the wear and damage of the piston rod 19 and a piston which connects to the piston rod 19 in the interior of the cylinder bore of the slave cylinder 2 is prevented well, thereby making it possible to improve the durability of the whole slave cylinder.

The retaining unit 8 constructed as described above is mounted such that the first retainer 25 surrounds the bleeder screw 7 fixedly screwed into a bleeder hole 27 of the cylinder body 11 before the slave cylinder 2 is installed on an automotive vehicle as part of a clutch piping system. The legs 25c, 25c of the first retainer 25 are disposed so as to extend from the bleeder screw 7 along the cylinder body 11 toward a direction in which the piston rod projects.

Additionally, the second retainer 26 is inserted over the projecting portion of the piston rod 19 with the inner curved surface thereof being oriented in a direction toward the cylinder body so as to be disposed near the outer end portion of the protection boot 20 before the piston rod 19 is assembled to the cylinder body 11. In this state, the piston rod 19 of the slave cylinder 2 is caused to project further than a retracted state shown in FIG. 2 by means of a return spring 28 adapted to expand freely in the fluid pressure chamber 17.

Next, the slave cylinder 2 is assembled to an automotive vehicle together with the clutch master cylinder 1 and the like as a clutch piping system 9, and a clutch fluid is filled in the clutch piping system 9 from the reservoir 3 to the slave cylinder 2, whereby the clutch piping system 9 is put in a pre-filled state. Then, the piston rod 19 of the slave cylinder 2 is forced into the cylinder bore 13 against the spring-back force of the return spring 28 and the fluid pressure exerted by the clutch fluid, and the engagement shafts 25i of the first engagement portions 25d of the first retainer 25 are brought into engagement in the engagement grooves 26c of the second engagement portions 26e of the second retainer 26 in a normal direction, whereby the retracted state of the piston rod 19 is retained.

The first and second engagement portions 25d, 26e which are brought into engagement with each other as described above are regulated with respect to an outward dislocation by virtue of the abutment of the first stoppers 25g with the anti-dislocation walls 26d, 26d and with respect to movements in axial directions of the piston rod by virtue of the abutment of the first and second stoppers 25g, 25h of the first engagement portion 25d with the second engagement portions 26e, whereby axial movements of the piston rod 19 are regulated.

The clutch piping system 9 pre-filled with the clutch fluid as described above is then transported to an assembly plant of a car manufacturer and is disposed in an engine compartment of an automotive vehicle. With the slave cylinder 2 being assembled to the vehicle body properly, the lug 25b is located to erect upwardly, whereas the slit 25e and the anti-dislocation piece 25f are located to be oriented downwardly. Then, when a worker pinches the lug 25b directly with the fingers or via a suitable tool and pulls it up from above the engine compartment, the anti-dislocation piece 25f of the first retainer 25 is brought into press contact with the bleeder screw 7 to be torn up thereby, and furthermore, the slit 25e is caused to open widely in lateral directions, whereby the assembling unit 25a is pulled up from the bleeder screw 7.

Following this, the legs 25c of the first retainer 25 twist sideways by virtue of the pulling force exerted thereon, the first engagement portions 25d which are in engagement with the engagement grooves 26c of the second engagement portions 26e in the perpendicular direction incline, the engagement shafts 25i of the first engagement portions 25d then dislocate outwardly from the engagement grooves 26c, and in the end, the entirety of the first retainer 25 is removed from the slave cylinder 2. On the other hand, the second retainer 26 released from the engagement with the first retainer 25 is left on the piston rod 19 as it is.

Thus, the piston rod 19 of the slave cylinder 2, which is retained in the retracted state, is caused to project in an extensible and retractable fashion by virtue of the spring-back force of the return spring 28 and the fluid pressure of the clutch fluid, and the outer end 19b of the piston rod 19 is then brought into abutment against a distal end of the release fork 21.

As has been described heretofore, according to the embodiment, the retaining unit 8 is constituted by the first retainer 25 mounted on the cylinder body side of the slave cylinder 2 and the second retainer 26 mounted on the piston rod side, and the first retainer 25 is constructed so as to be removed from the cylinder body side. In addition, the first and second engagement portions 25d, 26e of both the first and second retainers 25, 26 are connected to each other in such a manner as to freely be disengaged from each other so as to retain the piston rod 19 in the retracted state, whereas the engagement between the first and second engagement portions 25d, 26e is released by removing the first retainer 25 from the cylinder body side so as to permit the extension and/or retraction of the piston rod 19, and only the second retainer 26 of the holding unit 8 which is small and circular is then left on the piston rod 19.

Consequently, when compared with the conventional example in which the retaining belt-like string and the legs of the protection boot are cut, the embodiment of the invention eliminates a risk of exerting an unnecessary load on the protection boot 20 and seals in the interior of the cylinder bore 13, and therefore the durability of the slave cylinder can be improved. Moreover, the embodiment eliminates a risk of the circumference of the slave cylinder 2 getting dirty and damaged by burrs and/or cut particles to thereby cause no problem in servicing the slave cylinder for the maintenance purposes.

Additionally, while the legs 25c which look like the conventional ones are used in the first retainer 25 of the retaining unit 8, since the legs 25c are eliminated from the circumference of the slave cylinder when the first retainer 25 is removed after the slave cylinder 2 is assembled to the vehicle body, there is no risk of the legs 25 continuing to suspend from the slave cylinder 2 to thereby deteriorate of the external appearance of the relevant portion of the automotive vehicle.

Furthermore, according to the embodiment of the invention, since the free extensible and retractable movements of the piston rod 19 of the slave cylinder 2 is regulated by virtue of the engagement of the first and second engagement portions 25d, 26e of the retaining unit 8, in transporting pre-filled clutch piping systems 9, even if an external force acts on the piston rod 19 of the slave cylinder 2 in a direction in which the piston rod 19 is forced inwardly, a force-in position set on the piston rod 19 and the connecting condition of the first and second retainers 25, 26 can be maintained well, whereby the transportation mode of the clutch piping systems to an assembly plant of a car manufacturer can be maintained in a good condition.

Figure 7:
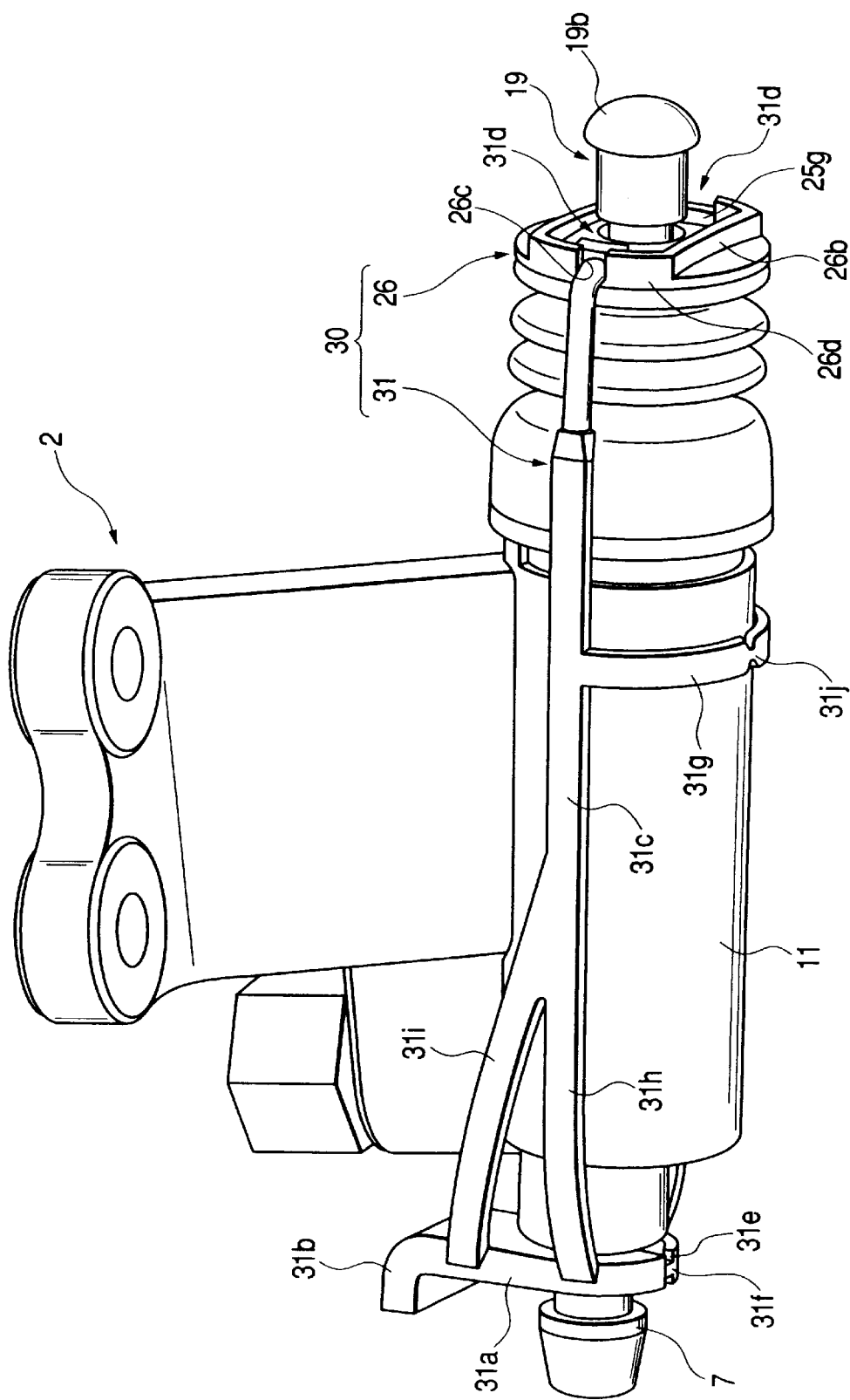
FIG. 7 is a perspective view of a slave cylinder according to a second embodiment of the invention in which a piston rod is kept retained in a retracted state by a retaining unit.
Figure 8:
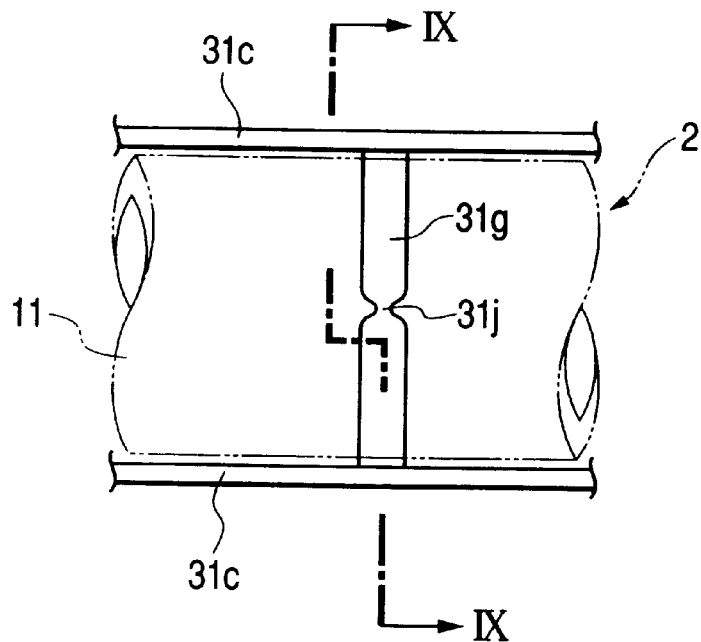
FIG. 8 is a plan view showing a main portion of the second embodiment shown in FIG. 7.
Figure 9:
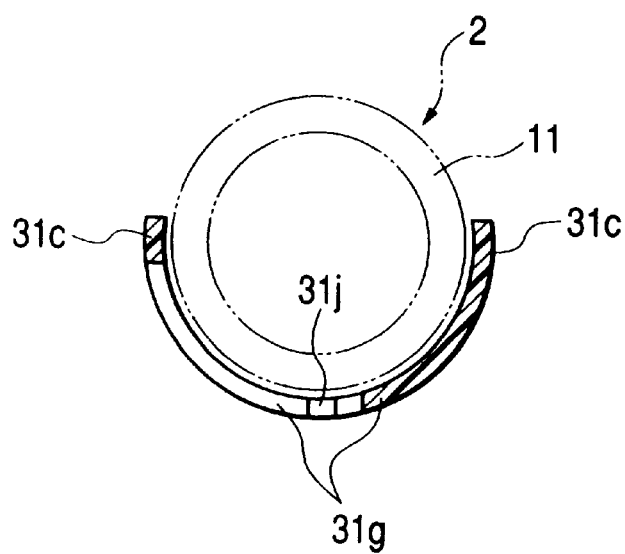
FIG. 9 is a sectional view taken along the line IX—IX in FIG. 8, showing the second embodiment of the invention.

FIGS. 7 to 9 show a second embodiment of the invention. A retaining unit 30 includes a combination of a first retainer 31 made of a synthetic resin which is mounted on a cylinder body 11 of a slave cylinder 2 in such a manner as to be disengaged therefrom and a second retainer 26 mounted on a projecting portion of a piston rod 19 which is identical to that described in the first embodiment.

Set on the first retainer 31 in a manner substantially similarly to that of the first embodiment are an assembling unit 31a and a lug 31b, first engagement portions 31d, 31d, a slit 31e and an anti-dislocation piece 31f. The second embodiment is different from the first one in that the shape of legs 31c, 31c is slightly changed and that there is additionally provided a lateral belt 31g for connecting the legs 31c, 31c together.

The respective legs 31c are bifurcated into supports 31h, 31i on a assembling unit side thereof; the supports 31h connecting to sides of the assembling unit 31a in a similar manner to the first embodiment, the supports 31i connecting to sides of the lug 31b, and these four supports 31h, 31i are constructed not only to improve the strength on the assembling unit 31a side but also to enable the stable pull-up removing operation of the first retainer 31 without a risk of the same being laterally deformed due to the lack of rigidity thereof when the first retainer 31 is pulled up by holding the lug 25.

The lateral belt 31g are located closer to first engagement portion sides of the respective legs 31c than intermediate portions thereof. In addition, the lateral belt 31g which arcs along half the outer circumference of the cylinder body 11 connects the pair of legs 31c, 31c together at an interval which is substantially equal to the diameter of the cylinder body 11. When the first retainer 31 and the second retainer 26 are mounted on the cylinder body 11 and the piston rod 19, respectively, and the piston rod 19 is retained in the retracted state, the lateral leg 31g is constructed to hold a lower half of the outer circumference of the cylinder body 11 with the legs 31c, 31c being positioned on the left-and right-hand sides of the cylinder body 11.

A narrow breakable portion 31j is provided at an intermediate portion of the lateral belt 31g by cutting the same belt inwardly from both sides thereof such that the narrow breakable portion 31j faces downwardly as well as the anti-dislocation piece 31f of the assembling unit 31a. The narrow breakable portion 31j functions to hold well the mounted state of the first retainer 31 to the cylinder body in the pre-filled state before the slave cylinder 2 is mounted on the body of an automotive vehicle. Further, the narrow breakable portion 31j enables the removal of the first retainer 31 from the cylinder body 11 by breaking following the breakage of the anti-dislocation piece 31f of the assembling unit 31a when the lug 31b is held to be pulled up after the slave cylinder 2 is mounted on the vehicle body.

According to this embodiment, while holding substantially the lower half of the outer circumference of the cylinder body 11, the lateral belt 31g connects together the legs 31c, 31c of the first retainer 31 on the first engagement portion side thereof at the interval which is substantially equal to the diameter of the cylinder body 11. Thus, when the piston rod 19, which is in the retracted state, tries to rattle or incline radially, since the lateral leg 31f regulates the movement of the legs 31c, 31c minimally, unnecessary movements of the piston rod 19 are suppressed to thereby effectively prevent the rattle and inclination of the piston rod 19. As a result, the wear and damage of the piston rod 19 and a piston which connects to the piston rod 19 in the interior of the cylinder bore of the slave cylinder 2 is prevented well, thereby making it possible to improve the durability of the whole slave cylinder.

Furthermore, while the rattle and inclination of the piston rod 19 is prevented with the lateral belt 31g, after the slave cylinder 2 is mounted on the vehicle body, the breakable portion 31j breaks so as to enable the removal of the first retainer 31 from the cylinder body in a simple and convenient fashion.

To be noticed, in the embodiments described heretofore, while the first retainer and the second retainer of the retaining unit are mounted, respectively, on the cylinder body side and the piston rod side with only the first retainer being adapted to be removed, the invention may permit to mount the first and second retainers the other way round, and alternatively, both the first and second retainers may be adapted to be removed. In a case where the first retainer has suspending legs, at least the first retainer has to be adapted to removed from either the housing or the piston rod.

Additionally, in the aforesaid embodiments, while the assembling unit of the first retainer is described as having the shape in which the slit in the C-shaped ring is the fine anti-dislocation piece, the invention may permit to use the C-shaped ring as it is without the anti-dislocation piece. The configurations of the first and second retainers and the manner of engagement thereof can be set other than described in the above embodiment. Furthermore, the retaining constructions according to the invention may be applied to a clutch master cylinder and a brake master cylinder as required.

While only certain embodiments of the invention have been specifically described herein, it will apparent that numerous modifications may be made thereto without departing from the spirit and scope of the invention.

As has been described heretofore, according to the automotive actuator retaining constructions of the invention, no unnecessary load is applied to the protection boot and seals in the interior of the cylinder bore to thereby improve the durability of the actuator, when compared with the conventional constructions in which the retaining string and the legs of the protection boot are cut for the removal of the retainer.

In addition, according to the invention, since there is produced no cut burrs and/or particles that would result from cutting, there is caused no such problem that the vicinity of the cylinder gets dirty to make it difficult to service the actuator for maintenance. Furthermore, since one of the retainers or the first retainer is removed from the housing or the piston rod, there is no retaining string or legs continuing to suspend in the vicinity of the cylinder which is released from the retracted state, and therefore there is no risk that the external appearance of the relevant portion of the automotive vehicle is deteriorated or servicing the actuator for maintenance is made difficult.

Moreover, according to the actuator retaining construction as set forth in the third aspect of the invention in which the assembling unit of the first retainer is formed into the C-shape, while the mounted state of the first retainer is well retained before the actuator is assembled to the vehicle body, after the actuator is assembled to the vehicle body, the first retainer can be removed from the actuator in the simple and convenient fashion.

In addition, according to the actuator retaining construction as set forth in the fourth aspect of the invention in which the plurality of legs for the first retainer are connected with the lateral belt, since the radial rattle and/or inclination of the piston rod in the retracted state can effectively be prevented, the unnecessary wear and/or damage can be prevented to thereby aim to improve the durability of the actuator. Furthermore, according to the actuator retaining construction as set forth in the fifth aspect of the invention in which the breakable portion is formed in the lateral belt, while the rattle and/or inclination of the piston rod can be prevented with the lateral belt before the actuator is assembled to the vehicle body, after the actuator is assembled to the vehicle body, the lateral belt breaks at the breakable portion to facilitate the removal of the first actuator from the actuator.

Additionally, according to the actuator retaining construction as set forth in the sixth aspect of the invention, since the axial extension of the piston rod of the actuator is regulated by the engagement between the first and second engagement portions, even if an external force is applied to the piston rod which is set at the predetermined forced-in position by the retaining construction, the connected state of the piston rod so set at the predetermined forced-in position and the first and second retainers can well be maintained.

What is claimed is:

1. An automotive actuator retaining construction for retaining a piston rod accommodated in a housing of an actuator in a state in which said piston rod is retracted in a direction toward said housing and releasing said piston rod from said retracted state so as to permit the extension and retraction of said piston rod when said actuator is put in operation, said automotive actuator retaining construction comprising:

a first retainer attached to one of said housing and said piston rod; and a second retainer attached to the other, wherein at least said first retainer is removable from said one of said housing and said piston rod, said first and second retainers are connected to each other in such a manner as to be disengaged from each other, wherein the engagement of said first and second retaining portions regulates movement in both axial directions, and wherein, when said first and second retainers are in engagement with each other, said retracted state of said piston rod is maintained, and when said engagement between said first and second retainers is released by removing said first retainer from said one of said housing and said piston rod, said piston rod is permitted to extend and retract.

2. An automotive actuator retaining construction for retaining a piston rod accommodated in a housing of an actuator in a state in which said piston rod is retracted in a direction toward said housing and releasing said piston rod from said retracted state so as to permit the extension and retraction of said piston rod when said actuator is put in operation, said automotive actuator retaining construction comprising:

a first retainer attached to one of said housing and said piston rod, said first retainer comprising:
      an assembling unit attached to said one of said housing and said piston rod in such a manner as to be disengaged therefrom;
      a plurality of connecting legs disposed so as to extend from said assembling unit along said one of said housing and said piston rod; and
      first engagement portions formed at distal ends of said respective connecting legs; and a second retainer attached to the other, said second retainer comprising second engagement portions engagable with said first engagement portions, wherein at least said first retainer is removable from said one of said housing and said piston rod, said first and second retainers are connected to each other in such a manner as to be disengaged from each other, and wherein, when said first and second retainers are in engagement with each other, said retracted state of said piston rod is maintained, and when said engagement between said first and second retainers is released by removing said first retainer from said one of said housing and said piston rod, said piston rod is permitted to extend and retract.

3. The automotive actuator retaining construction as set forth in claim 2, wherein said assembling unit of said first retainer surrounds one of said housing and said piston rod, and is formed into a substantially C-shape having a slit for removal of said first retainer in a certain part thereof.

4. The automotive actuator retaining construction as set forth in claim 2, wherein said plurality of connecting legs are connected to each other by a lateral belt holding one of said housing and said piston rod in a circumferential direction.

5. The automotive actuator retaining construction as set forth in claim 4, wherein said lateral belt comprises a breakable portion which is broken when said first retainer is removed.

6. The automotive actuator retaining construction as set forth in claim 2, wherein the engagement of said first and second retaining portions regulates an axial movement of said piston rod.

7. An automotive actuator retaining construction for retaining a piston rod accommodated in a housing of an actuator in a retracted state, comprising:

a first retainer attached to one of said housing and said piston rod and having a first engagement portion; and a second retainer attached to the other and having a second engagement portion engagable with said first engagement portion such as to retain said piston rod in the retracted state by the engagement of said first and second retainers, wherein at least said first retainer is removed from said one of said housing and said piston rod, when said first and second retainers are disengaged, and wherein the engagement of said first and second engagement portions regulates an axial movement of said piston rod in a retracted direction and an extended direction.

8. An automotive actuator retaining construction for retaining a piston rod accommodated in a housing of an actuator in a retracted state, comprising:

a first retainer attached to one of said housing and said piston rod and having a first engagement portion, said first retainer comprising:
      an assembling unit attached to said one of said housing and said piston rod in such a manner as to removable therefore at the time of the disengagement of said first and second retainers; and
      a plurality of connecting legs connecting said assembling unit to said first engagement portion; and a second retainer attached to the other and having a second engagement portion engagable with said first engagement portion such as to retain said piston rod in the retracted state by the engagement of said first and second retainers, wherein at least said first retainer is removed from said one of said housing and said piston rod, when said first and second retainers are disengaged.

9. The automotive actuator retaining construction as set forth in claim 8, wherein said assembling unit of said first retainer surrounds one of said housing and said piston rod, and is formed into a substantially C-shaped having a slit for removal of said first retainer in a certain part thereof.

10. An automotive actuator retaining construction for retaining a piston rod accommodated in a housing of an actuator in a retracted state, comprising:

a first retainer having a plurality of legs each having a first stopper and a second stopper, and an engagement shaft positioned between said first stopper and said second stopper;

a second retainer having engagement grooves, wherein said engagement shaft of each of said plurality of legs engages with said engagement grooves of said second retainer to maintain a retracted state of the piston rod such that said first stopper and said second stopper are positioned on opposing sides of said second retainer.

11. The automotive actuator retaining construction as set forth in claim 10, wherein said first retainer includes a ring body having a slit and lug, said plurality of legs extending from said ring body.

12. The automotive actuator retaining construction as set forth in claim 11, further comprising an anti-dislocation piece bridging said slit.

13. The automotive actuator retaining construction as set forth in claim 10, wherein said first stopper and said second stopper regulate axial movements of said piston rod in a retracted direction and an extended direction.

14. The automotive actuator retaining construction as set forth in claim 10, wherein said first stopper is a flat oval plate-like structure provided at a distal end of each of said plurality of legs.

15. The automotive actuator retaining construction as set forth in claim 14, wherein said second stopper is spaced away from said first stopper at an interval wider than a thickness of said second retainer such that said engagement shaft of each of said plurality of legs is engagable with said engagement grooves.

16. The automotive actuator retaining construction as set forth in claim 10, wherein said second retainer is a ring unit having a curved surface.

17. The automotive actuator retaining construction as set forth in claim 10, wherein said second retainer includes a through hole with a diameter larger than an outside diameter of a projecting portion of said piston rod.

18. The automotive actuator retaining construction as set forth in claim 17, wherein said second retainer includes a pair of reinforcement ribs such that said through hole is located therebetween.

19. The automotive actuator retaining construction as set forth in claim 10, wherein:

said second retainer includes a pair of reinforcement ribs; and said engagement grooves are positioned between said reinforcement ribs.

20. The automotive actuator retaining construction as set forth in claim 19, further comprising anti-dislocation walls which link said engagement grooves with outer ends of said reinforcement ribs such that engagement portions are formed by said engagement grooves and said anti-dislocation walls located on both sides of the each of said engagement grooves.

21. The automotive actuator retaining construction as set forth in claim 10, wherein each of said plurality of legs is bifurcated into supports.

22. The automotive actuator retaining construction as set forth in claim 21, further comprising a lateral belt which connects said plurality of legs.

* * * * *